Sept. 11, 1962  G. ALFIERI  3,053,578
DUPLEX DISTRIBUTORS FOR PNEUMATIC BRAKING
PLANTS, PARTICULARLY FOR VEHICLES
Filed July 9, 1959
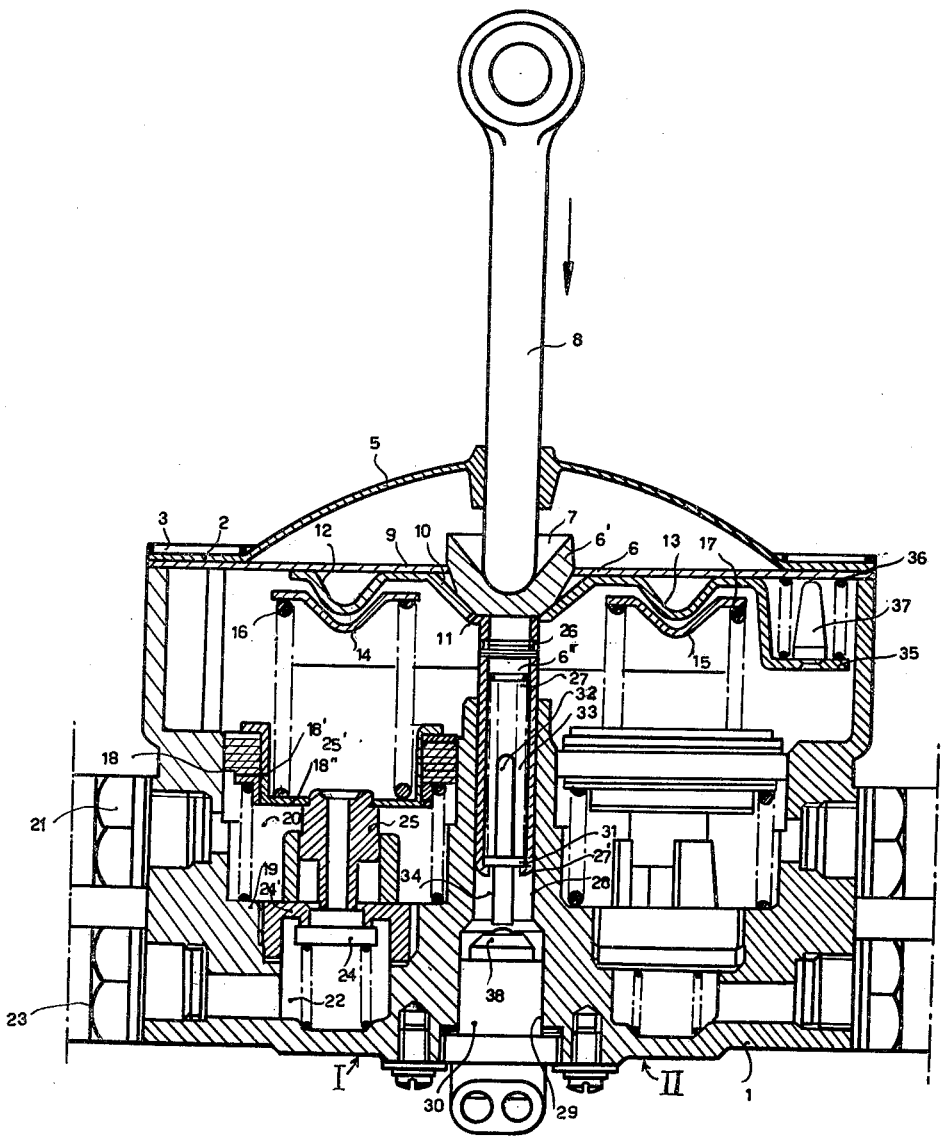

United States Patent Office 3,053,578
Patented Sept. 11, 1962

3,053,578
DUPLEX DISTRIBUTORS FOR PNEUMATIC BRAKING PLANTS, PARTICULARLY FOR VEHICLES
Giuseppe Alfieri, Milan, Italy, assignor to Fabbrica Italiana Magneti Marelli S.p.A., Milan, Italy, a firm
Filed July 9, 1959, Ser. No. 825,928
Claims priority, application Italy July 16, 1958
2 Claims. (Cl. 303—53)

The invention refers to a pressure air distributor for plants with two braking sections, particularly for pneumatic braking plants in vehicles with trailers.

It is known that in these plants the true driving devices of the distributors are rather complicated and cumbersome owing to their complicated lever systems.

This drawback is overcome according to the invention by inserting into the distributor a simple operation mechanism, that comprises substantially a push rod associated with the brake foot lever and a rocker acting upon the valve arrangement and embodied in a plate formed by shearing and drawing, the push rod acting upon the rocker through a spherical end of the former coacting with a spherical seat of the latter.

Another feature of the present invention is that it is possible to fit to a projection of the rocker an arrangement by which an advance in the braking action of one section of the distributor is obtained, for instance of the trailer section before the tractor section.

In order to obtain this advance, it is necessary, as it is well known, that in the trailer braking section the fluid pressure shall begin to increase before that acting in the tractor section.

The device that is adopted to advance the braking in one section with respect to the other, according to the invention, is constituted by a spring that applies a pressure on one side of the rocker, only when the rocker is removed from its rest position. Said rocker side under the spring pressure is that relating to the advance section.

Other features of the invention will be clearly evident from the following description together with the drawing, which shows a cross section of a distributor according to the invention. In the drawing, 1 indicates the distributor body, which may be a casting within which the operation members are disposed.

Said body is closed on the top by a flat cover 2, that is fixed to the body by a countercover 3 by means of screws, said countercover also fastening above the cover a protection hood 5.

The cover 2 has therein a central circular opening 6, wherein a hemispherical cup 6' is arranged. The cavity 7 of said hemispherical cup is turned outwardly as to the distributor body and forms a seat for the spherical end of a push rod 8, that is connected on its turn to the foot brake lever through a transmission lever (not shown in the drawing).

A rocker constituted by a drawn plate 9 is arranged inside of the distributor body near the cover 2, said plate providing in its central part a conical seat the lower edge of which forms a circular opening 11. On the plate 9, at the sides of the conical seat there are spherical seats 12, 13, the convex parts thereof directed towards the inside of distributor. Cups 14 and 15 partly surround the convex parts of the seats 12 and 13 and coact with springs 16, 17 of the valve arrangements which pertain to the respective distributor sections.

The valve arrangements of the two sections are like one another. Referring to the distributor section numbered I in the figure, there is formed a cylinder 18, within which a sealed plunger 18' moves under the resilient action of the spring 16. The head 18'' of said plunger and the wall 19 of the distributor body seal the chamber 20, which is connected to a pneumatic-hydraulic brake servocontrol (not shown in the drawing) by means of a pipe connection 21.

Said chamber 20 is connected to a chamber 22, that is fed from a section tank through fitting 23 and communicates with the chamber 20 through the seat 24' of an inlet valve 24, provided in the wall 19. The outlet valve is constituted by a block 25, inside of which there is provided a small hollow cylinder 25'. The block 25 is fitted to the head of the plunger 18', and has an opening of small diameter directed towards the inlet valve 24 and arranged in such a way as to engage this inlet valve, whereas the opening at its other end is directed towards the inside of plunger 18'' and communicates therefore with the free atmosphere.

The cup 6' that receives the push rod 8 has a cylindrical projection 6'', to which a small tube 27 is secured by means of a pin 26, said small tube being adapted to perform a sliding motion inside of a cylinder 28, machined in the distributor body 1.

The cylinder 28 is enlarged at its lower end so that it forms a chamber 29, wherein an electric contact device 30 is arranged.

The lower end 27' of small tube 27 is turned inwards to form a seat for a washer 31, against which abuts a helical spring 33, arranged inside of the small tube 27, whereas the other end of said spring is secured to the projection 6'', that penetrates into said small tube.

A ram 32 is integrally formed with said washer 31 and arranged in part inside of small tube 27 to project out from a hole 34 formed by the inwardly turned edge 27' and to engage operatively with the contact device 30.

The plate 9 constitutes the operation rocker of the distributor and has at one of its ends an L-shaped projection 35, that forms the seat of a spring 36 inside of the distributor. This spring is arranged between the projection 35 and the distributor cover 2, and a guide member 37 is provided for said spring fastened to the projection 35. Said spring, upon expanding, allows operation of one section in advance of the other.

The operation of the device is as follows:

A motion of the push rod 8 in the direction of the arrow as shown in the drawing takes place, when the brake foot lever is operated.

The push rod motion causes, through the cup coupling 6, a movement of the rocker 9 in a like direction, said rocker acting in turn upon the associated valve devices within the distributor sections causes the passage of pressure air from the section tank through fitting 23 to the operation servocontrol of the brakes (not shown in the drawing).

Referring to the distributor section I (as indicated in the drawing) it is to be remarked that the rocker 9 acts upon the regulation spring, under the action of the push rod 8, by causing motion of the plunger 18, that opens the inlet valve 24 through the block 25 forming the outlet valve. The air coming out from the tank, which is connected to the pipe connection 23 feeds the chamber 22, flows into the chamber 20 through the valve seat 24' and feeds the corresponding servocontrol by means of pipe connection 21. In this operation step the small cylindrical opening 25' through which air outlet from chamber 20 is permitted, bringing said chamber 20 into communication with the servocontrol, engages with the inlet valve 24.

The servocontrol operates at this time and can act therefore upon associated braking members.

Operation of the members of valve arrangement in section II takes place in like manner.

In said section II of the distributor, is arranged the advance device, as above described and is controlled substantially by the prestretched spring 36, that controls rocker 9, as soon as this latter is subjected to the action of the push rod 8. Said spring acts upon a rocker side by causing in such a way a greater shifting of the rocker on this side and establishes the advance operation of the servocontrol connected in the section II with respect to that one that is connected in the section I. The braking members associated with section II operate thus before those of section I. In the case of braking plants with two sections which are fitted to vehicle with trailers, advance braking of the trailer with respect to the tractor can be obtained by means of a distributor device as described above. Moreover, the embodiment of rocker 9 and arrangement of advance spring 36 associated therewith provide an advantage, which cannot be obtained with the devices already known, that is the rocker with its advance device can be inverted through 180°. This advance device can be arranged in such a way in one or the other of the distributor sections so that said distributor can be fitted either at the right or left side of the tractor in conformity with the drive requirements and plant arrangement in the tractor and trailer section.

It is to be remarked, moreover, that a movement of small tube 27 together with resiliently yielding ram 32 contained therein takes place during vehicle braking. Said ram 32 depresses push button 38 controlling the switch 30, after a short stroke of said members and before opening of the inlet valves, so that closure of signal and stop circuits takes place. The resiliently yielding ram enables a regular continuation of control stroke of plungers, that carry out opening of inlet valves after closure of the switch that is inserted in said signal circuit.

I claim:
1. A distributor for tractor-trailer pneumatic braking systems comprising a housing, first and second valve means mounted within the housing for controlling the flow of fluid to the tractor and trailer braking systems, respectively, a rocker arm mounted within the housing having one face thereof operatively connected to the valve means, said rocker arm comprising a sheet metal plate having a spherical seat formed in each end thereof and a truncated conical seat formed intermediate its ends, spring means mounted between each valve means and a respective spherical seat of the rocker for biasing said rocker away from the valve means, a push rod operatively connected to the rocker arm and extending outwardly from the housing for actuating the rocker arm, an L-shaped projection secured to one end of the rocker arm adjacent one of the valve means, an auxiliary spring mounted between the L-shaped projection and the housing for opening one of the valve means in advance of the other valve means upon actuation of the rocker arm by the push rod, and a cup member mounted between one end of the push rod and the truncated conical seat on the rocker arm, the convex portion of the cup being seated in the truncated conical seat, whereby the rocker arm can be rotated relative to the housing so that the L-shaped projection together with its associated auxiliary spring can be positioned adjacent either the first or second valve means.

2. A distributor for tractor-trailer pneumatic braking systems according to claim 1, wherein an electrical switch for controlling the stop signal circuit of the vehicle to be braked is positioned within the housing below the truncated conical seat formed on the rocker arm, a tube carried by the cup member and extending through the truncated conical seat, a ram slidably mounted within the tube and having one end extending therefrom, whereby inward movement of the cup member by the push rod means moves the ram to operate the electrical switch, and an override spring positioned within the tube between the other end of the ram and the cup member, whereby damage to the electrical switch by further inward movement of the push rod is prevented.

References Cited in the file of this patent

UNITED STATES PATENTS

| 2,062,167 | Dieter | Nov. 24, 1936 |
| 2,515,946 | Cadman | July 18, 1950 |
| 2,680,654 | Edge et al. | June 8, 1954 |
| 2,814,532 | Stephanski | Nov. 26, 1957 |

FOREIGN PATENTS

| 752,058 | Great Britain | July 4, 1956 |
| 315,375 | Italy | Feb. 23, 1934 |
| 549,930 | Italy | Oct. 18, 1956 |